(12) United States Patent
Sinha

(10) Patent No.: US 9,313,738 B2
(45) Date of Patent: Apr. 12, 2016

(54) METHODS FOR EFFICIENT POWER MANAGEMENT IN 60 GHZ DEVICES

(75) Inventor: Rajesh Kumar Sinha, San Diego, CA (US)

(73) Assignee: Broadcom Corporation, Irvine, CA (US)

(*) Notice: Subject to any disclaimer, the term of this patent is extended or adjusted under 35 U.S.C. 154(b) by 356 days.

(21) Appl. No.: 13/493,290

(22) Filed: Jun. 11, 2012

(65) Prior Publication Data

US 2013/0329576 A1 Dec. 12, 2013

(51) Int. Cl.
*H04W 52/02* (2009.01)

(52) U.S. Cl.
CPC ............ *H04W 52/0229* (2013.01); *Y02B 60/50* (2013.01)

(58) Field of Classification Search
CPC ............ H04W 52/02; H04W 52/0219; H04W 52/0216; H04W 52/0209; H04W 52/0235; H04W 52/146; H04W 52/16; H04W 52/243; H04W 52/247; H04W 52/60; H04W 24/00; H04W 52/0229; Y02B 60/50
USPC .................................................. 370/241, 252
See application file for complete search history.

(56) References Cited

U.S. PATENT DOCUMENTS

| | | | |
|---|---|---|---|
| 5,128,938 A * | 7/1992 | Borras | 370/311 |
| 5,799,256 A | 8/1998 | Pombo et al. | |
| 6,311,081 B1 | 10/2001 | Northcutt et al. | |
| 6,480,476 B1 * | 11/2002 | Willars | 370/311 |
| 6,804,542 B1 * | 10/2004 | Haartsen | 455/574 |
| 6,879,567 B2 * | 4/2005 | Callaway et al. | 370/311 |
| 7,295,827 B2 * | 11/2007 | Liu et al. | 455/343.2 |
| 7,447,526 B2 * | 11/2008 | Kim et al. | 455/574 |
| 7,747,273 B2 * | 6/2010 | Chou | 455/522 |
| 7,916,674 B2 * | 3/2011 | Hirano et al. | 370/311 |
| 7,995,543 B2 * | 8/2011 | Ho et al. | 370/338 |
| 8,045,494 B2 * | 10/2011 | Habetha et al. | 370/311 |
| 8,060,054 B1 * | 11/2011 | Dinan et al. | 455/343.4 |
| 8,331,299 B2 * | 12/2012 | Kim et al. | 370/329 |
| 8,351,996 B2 * | 1/2013 | Thomas et al. | 455/574 |
| 8,379,557 B2 * | 2/2013 | Sung et al. | 370/311 |
| 8,467,357 B2 * | 6/2013 | Wang et al. | 370/338 |
| 2005/0059437 A1 * | 3/2005 | Son et al. | 455/574 |
| 2005/0281320 A1 * | 12/2005 | Neugebauer | 375/141 |
| 2008/0214249 A1 * | 9/2008 | Kim et al. | 455/574 |
| 2010/0317374 A1 * | 12/2010 | Alpert et al. | 455/458 |
| 2011/0286375 A1 | 11/2011 | Chu et al. | |

OTHER PUBLICATIONS

WiGig White Paper: Defining the Future of Multi-Gigabit Wireless Communications, Jul. 2010, 5 pages.
WGA Specification, WGA-D104, Jan. 23, 2011, 378 pages.

\* cited by examiner

*Primary Examiner* — Chi H Pham
*Assistant Examiner* — Robert Lopata
(74) *Attorney, Agent, or Firm* — Brinks Gilson & Lione

(57) ABSTRACT

A device and method for managing power in a wireless telecommunication system. A telecommunication device operates in a power saving mode during a sleep interval whenever possible to minimize power drain. The telecommunication device monitors various device, channel and network parameters and dynamically adjusts the duration of the sleep interval based on the monitored parameters in order to optimize power savings.

9 Claims, 12 Drawing Sheets

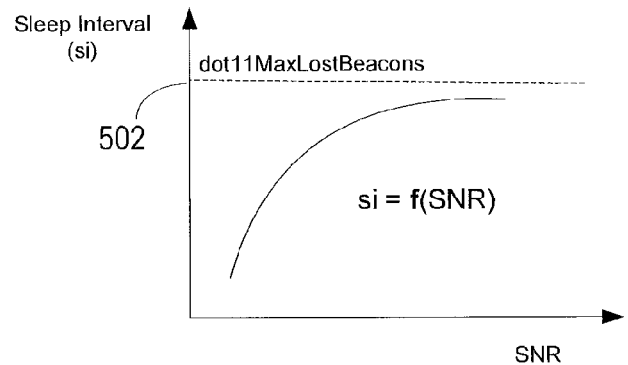
Figure 5A
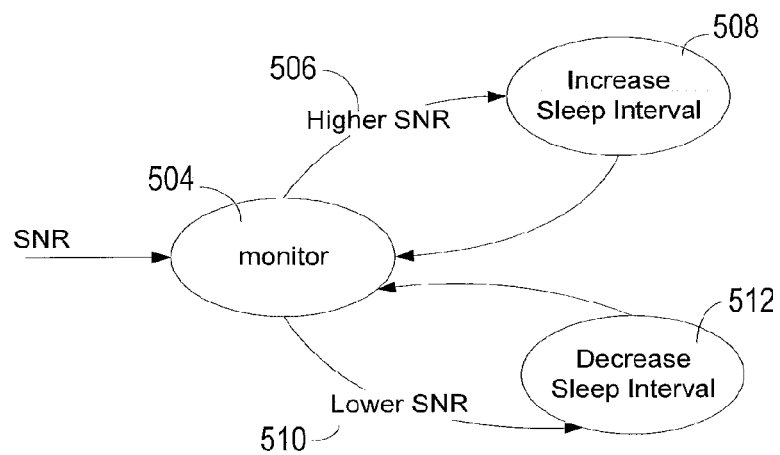
Figure 5B
Figure 5

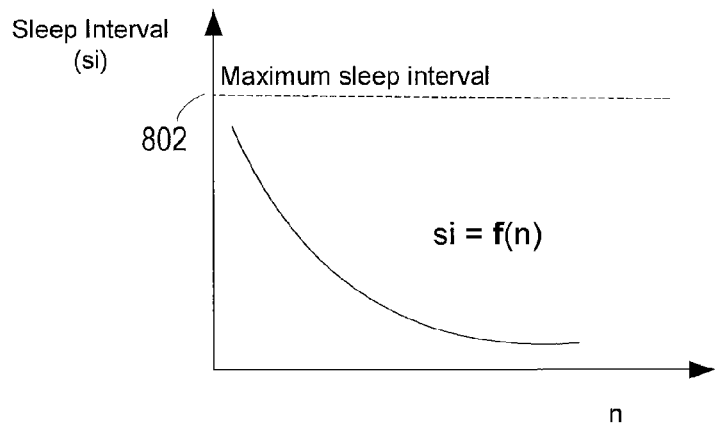
Figure 8A
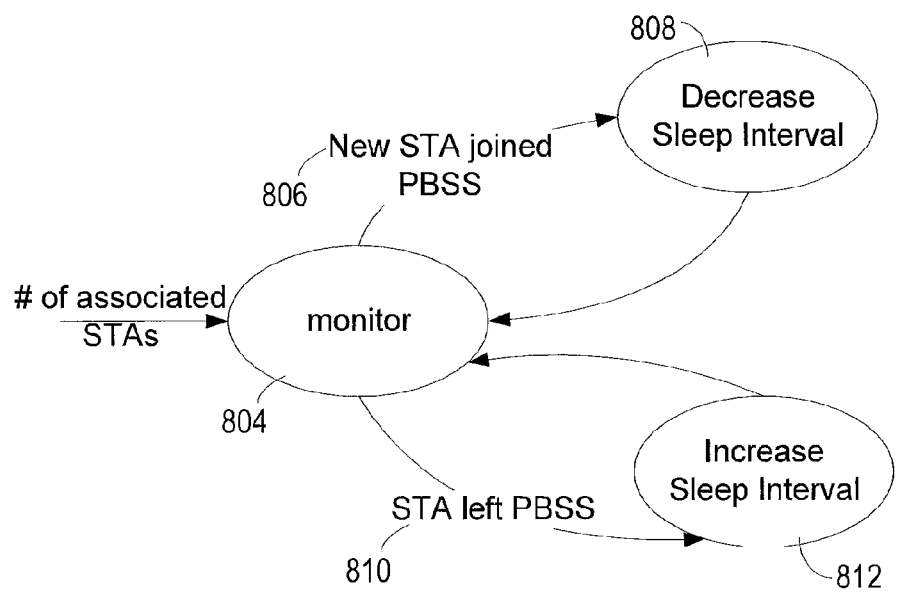
Figure 8B
Figure 8

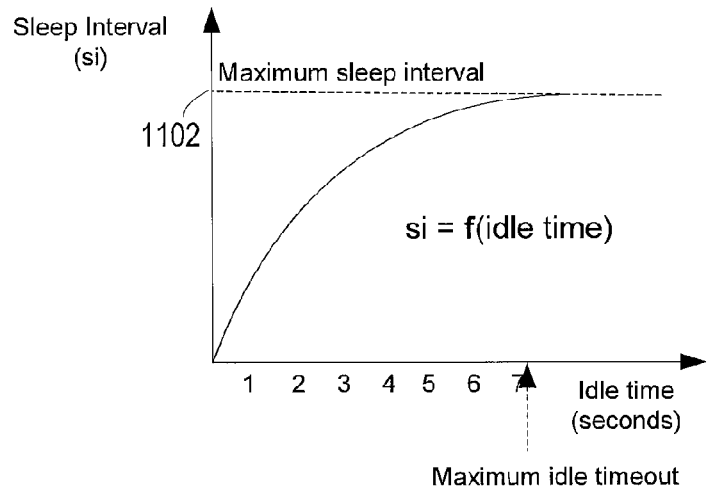
Figure 11A
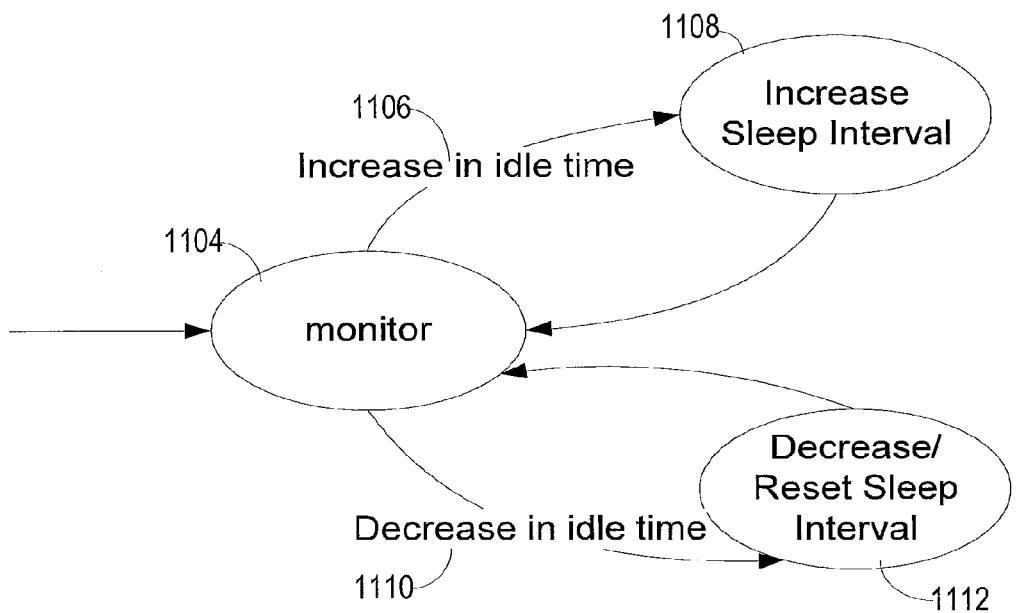
Figure 11B
Figure 11

METHODS FOR EFFICIENT POWER MANAGEMENT IN 60 GHZ DEVICES

TECHNICAL FIELD

This disclosure relates power management in telecommunication devices.

BACKGROUND

Rapid advances in electronics and communication technologies, driven by immense customer demand, have resulted in the widespread adoption of mobile communication devices. The extent of the proliferation of such devices is readily apparent in view of some estimates that put the number of wireless subscriber connections in use around the world at nearly 80% of the world's population. Furthermore, other estimates indicate that (as just three examples) the United States, Italy, and the UK have more mobile phones in use in each country than there are people living in those countries.

Power management is an important consideration in mobile communication devices. Portability requires that such devices be battery powered. User convenience requires that current drain from the battery be minimized to maximize the time before battery recharge is required. Accordingly, there is a need for improved power management in mobile communication devices.

BRIEF DESCRIPTION OF THE DRAWINGS

The innovation may be better understood with reference to the following drawings and description. In the figures, like reference numerals designate corresponding parts throughout the different views.

FIG. 5A is an example of use of a signal characteristic for determining duration of a sleep interval.

FIG. 5B is an example of relationship between duration of a sleep interval and signal to noise ratio and adjusting sleep interval timing.

FIG. 8 is an example of use of the number of stations active in a network for determining duration of a sleep interval.

FIG. 11 is an example of use of device activity level in a network for determining duration of a sleep interval.

DETAILED DESCRIPTION

Mobile telecommunications systems generally make provision for a low power operating mode by mobile devices operating in a system. For example, a mobile device may be permitted to enter a low power operating mode at a time when the mobile device is not active. The timing of entry and exit from the lower power operating mode may be based on system timing or particular timing assigned to the particular mobile device.

One example of a mobile communication system that make provision for a low power mode is a draft specification defined by the Wireless Gigabit Alliance (WGA) designated WGA-D104, dated Jan. 23, 2011 and incorporated herein by this reference. This document defines the physical (PHY) layer and Medium Access Control (MAC) layer for high throughput wireless networks. The specification supplements and extends the 802.11 (MAC) layer and is backward compatible with the IEEE 802.11 standard published by the Institute of Electrical and Electronics Engineers, Inc. (IEEE). Devices in this specification operate at frequencies in the range of 60 GHz. The specification may be referred to as WiGig technology.

For power management, the WiGig specification provides a scheduled access mode to reduce power consumption. Two devices communicating with each other via a directional link may schedule the periods during which they communicate. In between those periods, they can enter the low power mode to save power. This capability allows devices to adjust power management to actual traffic conditions. This feature is especially important for cell phones and other handheld battery-powered devices.

Figure 1:
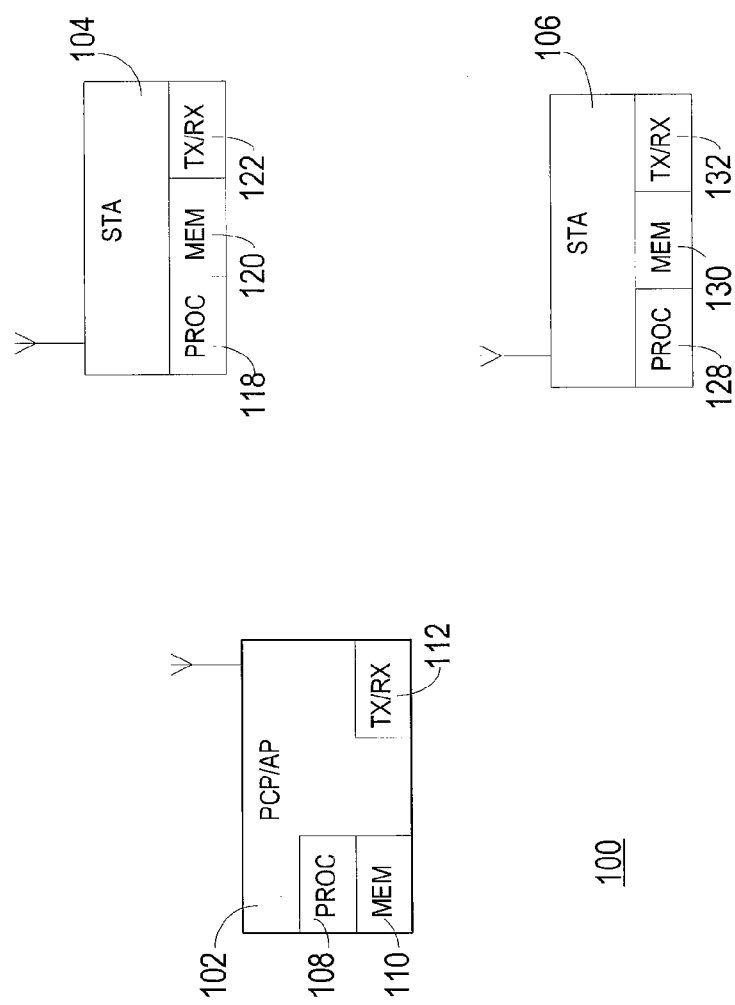
FIG. 1 shows an example of telecommunications network.

FIG. 1 shows an example of telecommunications network. The telecommunications network in this example defines a personal basic service set (PBSS) 100. The PBSS 100 includes a PBSS control point (PCP) or access point (AP), referred to here as PCP/AP 102 and two stations (STA), including a first station 104 and a second station 106. The PBSS 100 is intended to be exemplary only so as to demonstrate relevant principles described herein.

The PCP/AP 102 generally includes a processor 108, a memory 110 and a radio circuit 112. The processor 108 controls operation of the PCP/AP 102 under control of instructions and data stored in the memory 110. The processor 108 may include one or more circuits for controlling the hardware and software functions of the PCP/AP 102, such as one or more microprocessors and analog circuitry. The memory 110 may include both persistent and volatile memory and may be distributed among a variety of memory devices. The radio circuit 112 permits radio communication with other radio devices such as the first station 104 and the second station 106. The radio circuit 112 may include a receiver, transmitter or transceiver and may be operable in conjunction with one or more radio communication standards such as WiGig or WGA, WiFi, WiMAX, CDMA, GSM or other standards. In a WGA system, the PCP/AP 102 establishes and ad hoc network and generally controls network communication including timing and synchronization and entry and departure to the network by other communication devices such as the first station 104 and the second station 106. Moreover, the radio circuit 112 performs functions such as estimation of channel parameters such as signal to noise ratio.

The first station 104 similarly includes a processor 118, memory 120 and a radio circuit 122. The second station 106 similarly includes a processor 128, memory 130 and a radio circuit 132. The processors 118, 128, the memory 120, 130 and the radio circuits 122, 132 may generally be similar in functionality to the respective processor 108, memory 110 and radio circuit 112 of the PCP/AP 102. The first station 104 and the second station 106 may be similar or even identical but need not be. However, the radio circuits 112, 122, 132 are generally compatible in that they can exchange radio transmissions in accordance with the controlling specification. Thus, the specification defines features to which the PCP/AP 102 and stations 104, 106 conform, such as frequency band of operation, timing of transmissions and reception, format of transmission of data, etc. One example feature is a beacon which is transmitted and contains synchronization information and data. Beacons are transmitted according to specified timing referred to as a beacon interval. Another example in the WGA specification is a DBand beacon, transmitted on the 60 GHz frequency band.

The exemplary WGA embodiment includes features permitting a low power mode by the first station 104 and the second station 106. In the PBSS 100, devices are considered either a PCP, such as PCP/AP 102, or non-PCP/non-AP STAs such as station 104 and station 106. To enable non-PCP/non-AP STAs and PCPs to sleep for one or more beacon intervals, a non-PCP/non-AP STA power save mechanism and a PCP power save mechanism are defined in the WGA specification.

For a non-PCP/non-AP STA such as station 104 and station 106, power save mode allows a non-PCP/non-AP STA to sleep at intervals negotiated with the PCP/AP 102. Each non-PCP/non-AP STA, station 104 and station 106, can choose an independent wakeup interval that fits its own power consumption and traffic delivery requirements. The PCP/AP 102 keeps track of sleep intervals of all associated non-PCP/non-AP STAs, stations 104 and station 106 in the PBSS 100 and delivers traffic to each non-PCP/non-AP STA only when the intended destination is awake. In the same way, any non-PCP/non-AP STA communicates traffic to its peer non-PCP/non-AP STA only when it is awake.

PCP Power Save (PPS) mode allows a PCP such as the PCP/AP 102 to sleep for one or more consecutive beacon intervals to minimize energy consumption in the sleeping device. In this context, sleeping refers to entering a low power saving mode of operation in which much of the power consuming circuitry is de-energized to reduce power consumption. The PCP operating in PPS mode may sleep for one or more consecutive beacon intervals and does not transmit DBand Beacons during this time. Before going into sleep mode, the PCP announces necessary information, such as sleep duration and scheduling information, to the non-PCP STAs stations 104 and station 106 in the PBSS 100 so that the stations 104 and station 106 can communicate with each other while the PCP is sleeping.

An STA such as station 104 and station 106 may operate in one of two power states according to the WGA specification. In the Awake state, the STA is fully powered. In the Doze state, the STA is not able to transmit or receive and consumes very low power.

An Awake beacon interval for a STA is defined to be a beacon interval during which the STA is be in the Awake state for at least some period of time. The beacon interval when a STA is in the Doze state is referred to as a Doze beacon interval.

When a non-PCP/non-AP STA such as the first station 104 or the second station 106 enters power save (PS) mode, it will alternate between Awake and Doze state. Any non-PCP/non-AP STA should be in Doze state as long as possible to save more power. The interval, in terms of beacon intervals, between successive Awake beacon intervals is called the sleep interval. The longer the duration of the sleep interval, the greater is the power savings.

The duration of the sleep interval is implementation dependent. The WGA specification does not provide guidelines. There is therefore a need for methods by which a STA can define the sleep interval. There also is a need for methods by which the non-PCP/non-AP STA can dynamically change its sleep interval to save more power whenever possible without losing sync with the PCP or other STAs in the PBSS.

Figure 2:
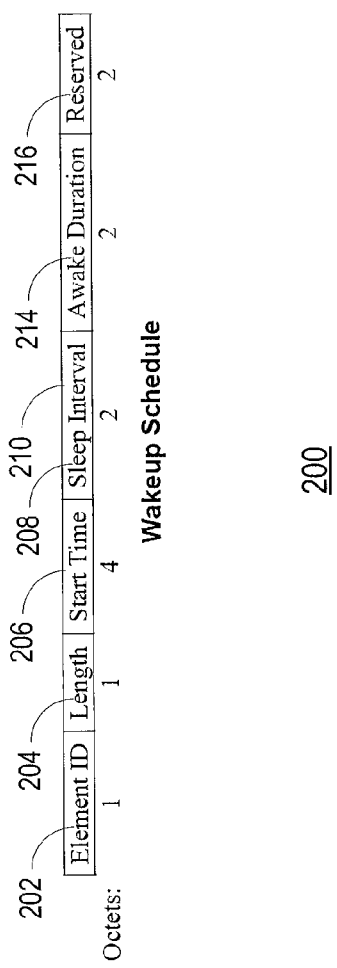
FIG. 2 is an example of format of a Wakeup Schedule Information Element.

Before transitioning from Active mode to PS mode, a non-PCP/non-AP STA that is associated with a PCP/AP may establish a wakeup schedule with the PCP/AP. The sleep interval is part of the Wakeup Schedule Information Element (IE) communicated by the non-PCP/non-AP STA. The format 200 of the Wakeup Schedule IE is shown in FIG. 2. The Wakeup Schedule IE includes an element identifier field 202, a length field 204, a start time field 206, a sleep interval field 208, an awake duration field 210 and a reserved field 212. Each of the illustrated fields has a length equal to the number of octets or bytes shown in FIG. 2. Thus, the element identifier field is one octet long and the start time field is four octets long, for example.

A non-PCP/non-AP initiates the sleep mode by transmitting to the PCP/AP a Power Save Configuration Request (PSC-REQ) frame. The PCP/AP responds with a Power Save Configuration Response (PSC-RSP) frame. An exemplary PSC-REQ frame includes a Power Management (PM) field and a Wakeup Schedule (WS) field. Setting the PM field to 0 indicates a transition from power save mode to active mode. Setting the PM field to 1 indicates a transition from active mode to power save mode. The WS field includes a Start Time and a Sleep Interval. The Start Time indicates the time of the first Awake BI. The Sleep Interval field is 2 octets and indicates the time, expressed in number of BIs, between two successive Awake BIs.

A wakeup schedule (WS) is established by the non-PCP/non-AP STA with the PCP/AP following the successful transmission of a PSC-REQ frame to the PCP/AP with a Wakeup Schedule information element and with the PM field set to 1 and an acknowledged receipt of the corresponding PSC-RSP from the PCP/AP provided that the PSC-RSP containing a status code indicating success. A non-PCP/non-AP STA that is already in power saving mode but without a WS established with its PCP/AP may transmit a PSC-REQ frame including a Wakeup Schedule element to set up a WS with the PCP/AP. After receiving a PSC-RSP from the PCP/AP with a status code indicating success, the STA follows the WS established with the PCP/AP.

Figure 3:
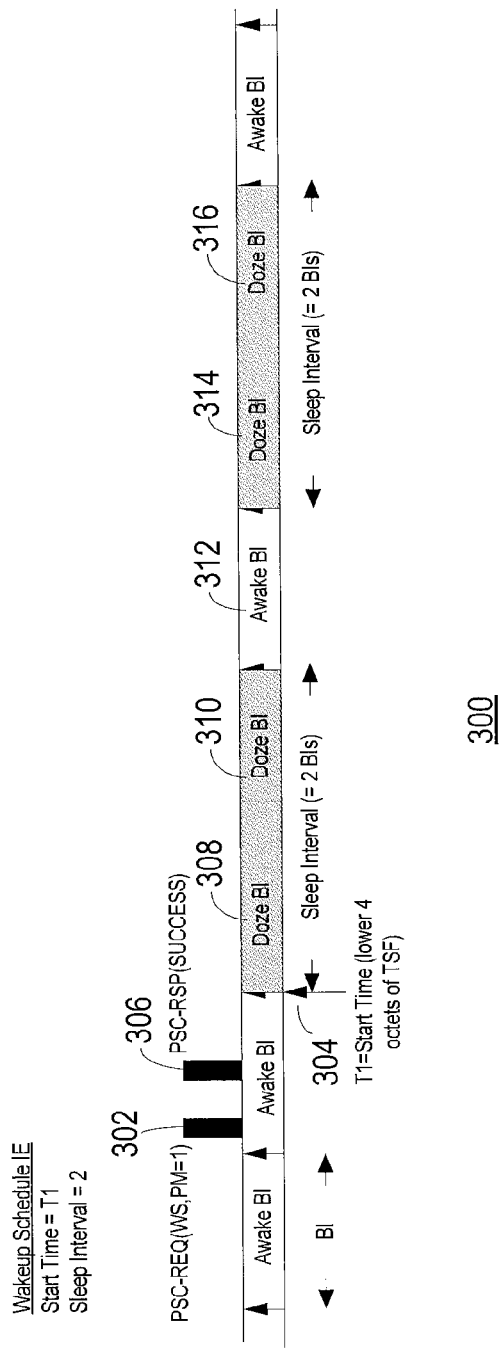
FIG. 3 is an example of timing for a Wakeup Schedule.

If a non-PCP/non-AP STA has explicitly established a WS with the PCP/AP and the non-PCP/non-AP STA is in PS mode, every n-th BI is an Awake BI for the non-PCP/non-AP STA, where n is the value from the Sleep Interval field contained in the WS established after successful frame exchange of PSC-REQ and PSC-RSP. This is demonstrated in FIG. 3, which shows an example timing diagram 300 for a Wakeup Schedule. In FIG. 3, a non-PCP/non-AP STA transmits a PSC-REQ 302 specifying a Wakeup Schedule Information Element with sleep time set at T1 304 and a sleep interval of 2 Awake BIs. The PCP/AP responds with a PSC-RSP 306 confirming successful establishment of the Wakeup Schedule. The non-PCP/non-AP STA then enters low power sleep mode for two beacon intervals including first doze beacon interval 308 and second doze beacon interval 310. Following the second doze beacon interval 310, the non-PCP/non-AP STA exits the sleep mode for an awake interval timed as one awake beacon interval 312. If there is no communication scheduled or if there is no page for the non-PCP/non-AP STA during the awake beacon interval 312, the non-PCP/non-AP STA then again enters low power sleep state (or Doze state)

for two beacon intervals including first doze beacon interval 314 and second doze beacon interval 316.

In a PBSS such as the PBSS 100 of FIG. 1, the PCP/AP 102 is the timing master for the timing synchronization function (TSF). The PCP/AP 102 periodically transmits special frames called DBand Beacon frames and Announce frames which contain a copy of the PCP's TSF timer to synchronize the TSF timers of other STAs in a PBSS. A receiving STA shall accept the timing information in DBand Beacon and Announce frames sent from the PCP servicing its PBSS. If a STA's TSF timer is different from the timestamp in the received DBand Beacon or Announce frame, the receiving STA shall set its local TSF timer to the received timestamp value to maintain synchronization with the PCP.

During the Doze BIs, while in the low-power sleep state, the STA will not receive or transmit any frames. Hence the STA will not be able to receive any beacons, announce frames or any management frame from the PCP/AP or any other non-PCP/non-AP STAs. Hence the STA should, while deciding on the sleep interval, ensure that it does not lose sync with the PCP/AP or any other STA. The following methods will allow a DBand non-PCP/non-AP STA to maximize its power savings by dynamically optimizing its sleep interval based on several surrounding conditions and factors but without losing sync with the PCP and without affecting its response time.

Use of Maximum Beacon Timing Parameter

Some telecommunications systems specify a maximum timing parameter which specifies the maximum time duration during which a device may be out of communication. For example, the WGA specification defines a parameter labeled dot11MaxLostBeacons. Similar parameters exist for other IEEE 802.11 telecommunication standards. In a WGA PBSS such as the PBSS 100 of FIG. 1, the DBand STAs such as STA 104 and 106 expect to receive at least one DBand Beacon frame or one Announce frame in dot11MaxLostBeacons number of beacon intervals to remain synchronized with the PCP (TSF). If the value of dot11MaxLostBeacons is set to 4, for example, and more than 3 beacon intervals have passed without the STA receiving a DBand Beacon frame or Announce frame, the STA will be considered to have lost synchronization and have to re-obtain system synchronization. Thus, in such systems, dot11MaxLostBeacons forms a maximum beacon timing parameter. Other systems will define parameters which perform a similar function and which can be used to similar effect. Generally, these parameters are for system reliability because they help to ensure that any transmission from any transmitter is reliably received by a receiver.

A STA might fail to receive up to (dot11MaxLostBeacons−1) number of consecutive beacons with Extended Schedule elements and still may access the channel during the allocation based pseudo-static scheduled service period (SP) or Contention Based Access Period (CBAP). The STA ceases transmission during a pseudo-static allocation if the STA fails to receive an Extended Schedule element in a DBand Beacon for dot11MaxLostBeacons consecutive beacon intervals. If a STA does not receive any beacons from the PCP/AP for dot11MaxLostBeacons number of beacon intervals, the STA considers that as a connection timeout and assumes that the PCP/AP is no longer available and disconnects from the PCP/AP. Thus, the parameter dot11MaxLostBeacons forms a system reliability parameter in a WGA network.

So, a STA can possibly sleep for up to (dot11MaxLostBeacons−1) number of consecutive beacon intervals, and then wake up to receive the beacon frame to remain in synchronization with system timing. Hence, the sleep interval can have a maximum value of (dot11MaxLostBeacons−1).

si=Sleep Interval

MAX(si)=dot11MaxLastBeacons 1

The value of dot11MaxLostBeacons may be an integer and may have a system default value or may be set in a communication from the PCP/AP to the STA which overrides the default value. The STA may include a maximum sleep time duration module which receives the current value of the parameter dot11MaxLostBeacons and determines the maximum sleep interval duration based on the parameter. The maximum sleep time duration module may be implemented in hardware or software, such as a software routine executable by a processor of the STA.

Having the sleep interval si set to the maximum value may not always be the most appropriate in all applications. For example, during the beacon interval in which the STA exits the low power sleep state in order to be awake to receive the next beacon, the beacon could be missed due to interference or some other reason. If the beacon is missed, synchronization with the system will be lost. Accordingly, in some embodiments, the sleep interval may be directly proportional to the value dot11MaxLostBeacons or may in some other way be scaled to a smaller number than the maximum value.

$$si \propto dot11MaxLostBeacons$$

$$si = k * dot11MaxLostBeacons$$

where $$0 < k \leq \frac{dot11MaxLostBeacons - 1}{dot11MaxLostBeacons}$$

The value of the parameter k will be a constant for a STA and will be pre-configured. The choice of this value will be implementation dependent.

The maximum beacon timing parameter dot11MaxLostBeacons is a management information base (MIB) attribute and is included by the PCP/AP in DBand Operation element in DBand beacon frames. While associated with a PCP/AP, a STA overrides the value of its local dot11MaxLostBeacons attribute with the value of this field when it receives this element from its PCP/AP. The sleep interval may be calculated based on the above expression and may be used whenever the STA goes to power save mode during the time when the STA is associated with that PCP.

Figure 4:
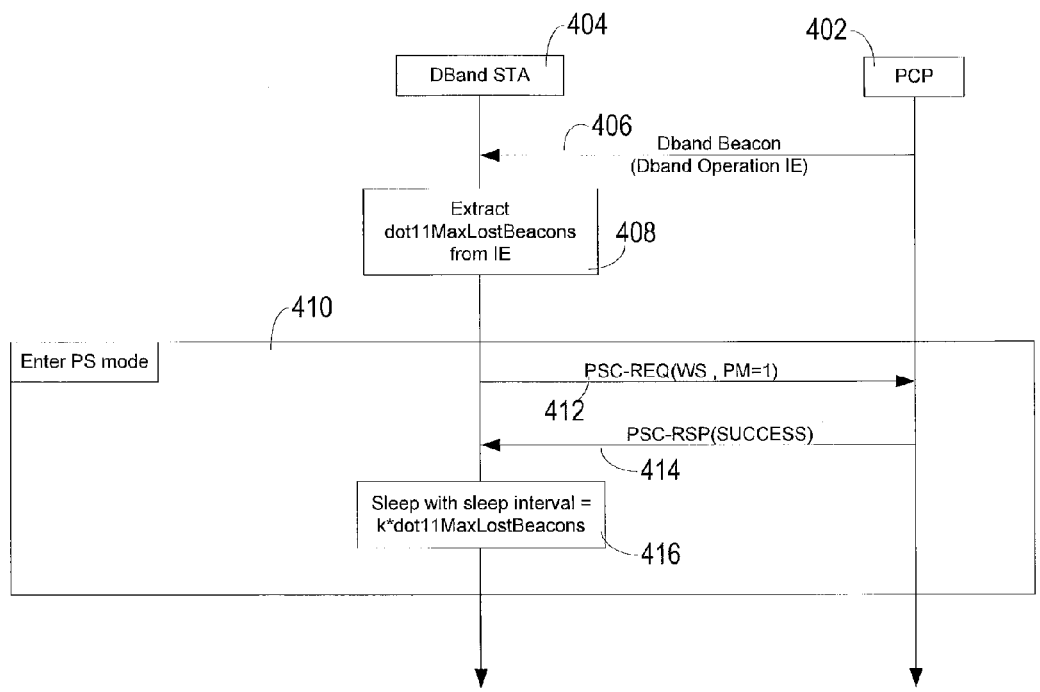
FIG. 4 is an example message sequence diagram illustrating operation of a telecommunication system.

FIG. 4 shows an example message sequence diagram illustrating operation of a telecommunication system. FIG. 4 illustrates one example of a PCP/AP 402 communicating with a non-PCP/non-AP STA 404. At step 406, a DBand Beacon is transmitted by the PCP/AP 402 and received by the STA 404. Transmission may be performed conventionally using assigned frequency and time channels. The beacon is a data transmission having predefined data elements or fields populated with appropriate data by the PCP/AP 402. The STA 404 processes the received beacon in the normal way, reading the contents of the data elements that form the beacon. At step 408, the STA 404 extracts the value of the parameter dot11MaxLostBeacons from the DBand Operation information element present in the DBand Beacon frame received from PCP 402. The STA 404 then begins a process of entering Power Save mode, step 410. When the STA 404 goes to Power Save mode, it will set the sleep interval in its wakeup schedule as k*dot11MaxLostBeacons where k is a pre-configured constant.

At step 412, the STA 404 lets the PCP 402 know that it is entering the Power Save mode. The STA 404 transmits a Power Save Configuration Request (PSC-REQ) including a Wakeup Schedule (WS) and with a Power Management field set to a value of 1 to indicate a transition from active mode to power save mode. The WS includes a Start Time field indicating the start time of the power save mode, and a Sleep Interval field which indicates the time, expressed in number of beacon intervals, between two successive Awake beacon intervals. The PSC-REQ is received by the PCP 402 and processed. In particular, the duration of the power save mode is detected and stored at the PCP 402. The PCP 402 responds with a power save configuration response (PSC-RSP) confirming entry in to the power save mode. At step 416, the STA enters the power sleep mode for an interval equal to Vdot11MaxLostBeacons.

Use of Signal to Noise Ratio

Since the STA has to be synchronized with the PCP and has to have its timing synchronization function (TSF) synchronized with that of PCP, the STA has to receive beacons at regular intervals including at-least once every dot11MaxLostBeacons beacon intervals, where dot11MaxLostBeacons is a parameter defined locally or system-wide. However, the quality of signals or the channels in which the signals propagate may vary over time. Depending on the channel condition and levels of noise and interference, some beacons may not be received correctly by the STA. For example, due to noise or interference, error detection features such as a cyclic redundancy check or checksum may indicate an error in the received data of the beacon. If a beacon is not received correctly, the beacon, to the extent it was received by the STA, will be discarded by the STA. Hence the STA should be awake for a longer time so that it can receive the beacons and other management frames sent to it by other peer STAs if the channel condition is poor. Thus, in some embodiments, it may be useful to establish the sleep interval as a function of a time-varying channel characteristic or signal characteristic. On example of such a characteristic is the channel quality or signal to noise ratio (SNR). The duration of the sleep interval should be reduced if the channel condition deteriorates. Similarly, the duration of the sleep interval should be increased if the channel condition improves.

In some embodiments then, the duration of the sleep interval will be established based upon the measured SNR level. The higher the SNR, higher will be the sleep interval.

$$si = f(SNR)$$

FIG. 5 is an example of use of signal to noise ratio for determining duration of a sleep interval. FIG. 5A is one example of a relationship between duration of a sleep interval and signal to noise ratio. In the example of FIG. 5, the duration of the sleep interval may be increased non-linearly as SNR increases, approaching a maximum value 502 of dot11MaxLostBeacons. The relationship may be non-linear as shown in FIG. 5A but may have any shape. Generally, the function f is implementation specific and may change dynamically with the radio environment where the STA and the PCP operate. In the exemplary embodiment according to the WGA specification, SNR is measured in dB and covers from −13 dB to 50.75 dB in 0.25 dB steps. Accordingly one example of the function f is $$si = f(SNR) = \left\lfloor M_{si} * \sin\left(\frac{\pi}{2} * \frac{SNR+13}{63.75}\right) \right\rfloor$$

where $$-13 \text{ dB} \leq SNR \leq 50.75 \text{ dB}$$

where $M_{si}$=maximum desired sleep interval and $$0 < M_{si} < \text{dot11MaxLostBeacons}$$

A non-PCP/non-AP STA can determine the duration of a sleep interval based on the current SNR detection for the channel. If the SNR decreases, the STA may reduce the duration of the sleep interval. Similarly, the STA may increase duration of the sleep interval if the SNR improves. In one embodiment, the STA sets the duration of the sleep interval to a fallback value if the SNR decreases and, when the SNR increases, slowly increases the sleep interval duration (in steps) to effectively de-bounce the process.

FIG. 5B is an example state machine describing operation of a non-PCP/non-AP STA for Sleep Interval increase and decrease based on signal to noise ratio. The state machine is implemented on a communication device operating in a telecommunication network, such as a station 104, 106 of the PBSS of FIG. 1. Operation begins at a monitor state, state 504. When the STA detects a higher SNR, step 506, indicative of improving channel conditions and increased reliability of detection of beacon or management frames, operation moves to state 508 where the duration of the sleep interval is increased. Operation then returns to the monitor state 504. When the STA detects lower SNR, indicative of worsening channel conditions and reduced reliability of detection of the final beacon interval transmission, operation moves to state 512, where the duration of the sleep interval is decreased. Operation then returns to the monitor state 504.

Figure 6:
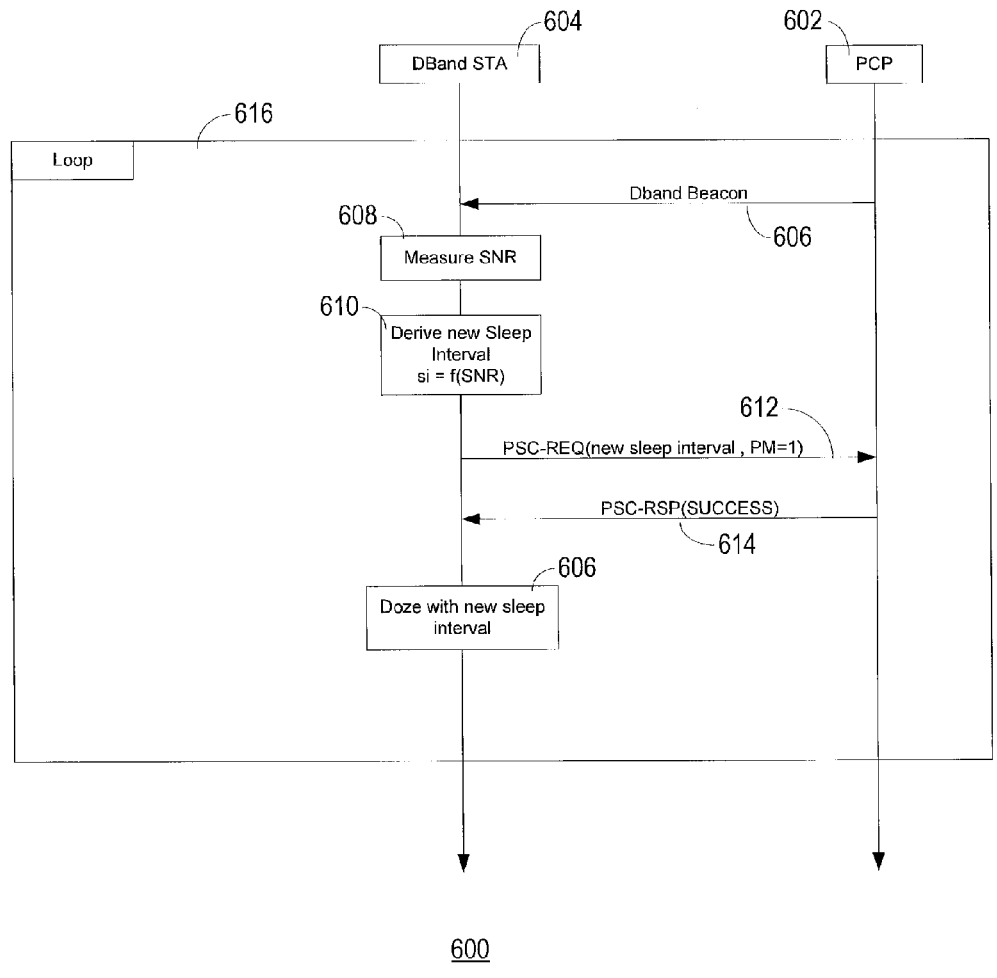
FIG. 6 is an example message sequence diagram illustrating interaction between elements of a telecommunication system for adjusting sleep interval duration according to a channel characteristic.

FIG. 6 is an example message sequence diagram 600 illustrating interaction between elements of a telecommunication network for adjusting sleep interval duration according to a channel characteristic such as signal to noise ratio. The process begins with the PCP 602 transmitting to the STA 604. For example, the PCP 602 transmits a DBand Beacon.

At step 608, SNR is measured. The SNR of concern may be measured at the non-PCP/non-AP STA 604 itself upon receiving DBand beacons from the PCP/AP. For example, the STA may implement a signal to noise ratio module. The SNR module may implemented in hardware or software and it may be included as part of a radio circuit or as part of a processor of the STA. If there is any change in the SNR, a new Sleep Interval will be determined, step 610. The determined new sleep interval will be included in the new Wakeup Schedule element and a new Power Save Configuration Request PSC-REQ(new WS, PM=1) will be sent to PCP 602 to inform the PCP 602 of the intent of the STA 604 to change its wakeup schedule. In response, the PCP 602 returns a Power Save Configuration Response, step 614. Once the STA 604 receives the PSC-RSP(SUCCESS) from PCP 602, the STA 604 can then use the new sleep interval. In this manner, the STA 604 can adapt to its channel conditions and tune the sleep interval duration accordingly, enabling it to sleep for longer and save more power when the conditions are favorable but reducing the sleep interval duration when conditions are less favorable.

Variation of sleep interval duration in step 610 will be implementation dependent. In one example, the STA 604 may immediately decrease the sleep interval duration to a fallback value when the SNR decreases. Subsequently, the STA 604 may only Increase the sleep interval duration if the SNR increases and is stable for a predetermined time.

The embodiments described herein use signal to noise ratio as a factor in deciding duration of the sleep interval. However, it is to be understood that any channel parameter such as fading, delay, error rate, for example, may be used. Signal to noise ratio is commonly measured in a radio circuit such as is used in a mobile radio or other device. However, other channel parameters are also measured or estimated and may provide reliable estimates of dynamic channel quality, alone or in combination.

Figure 7:
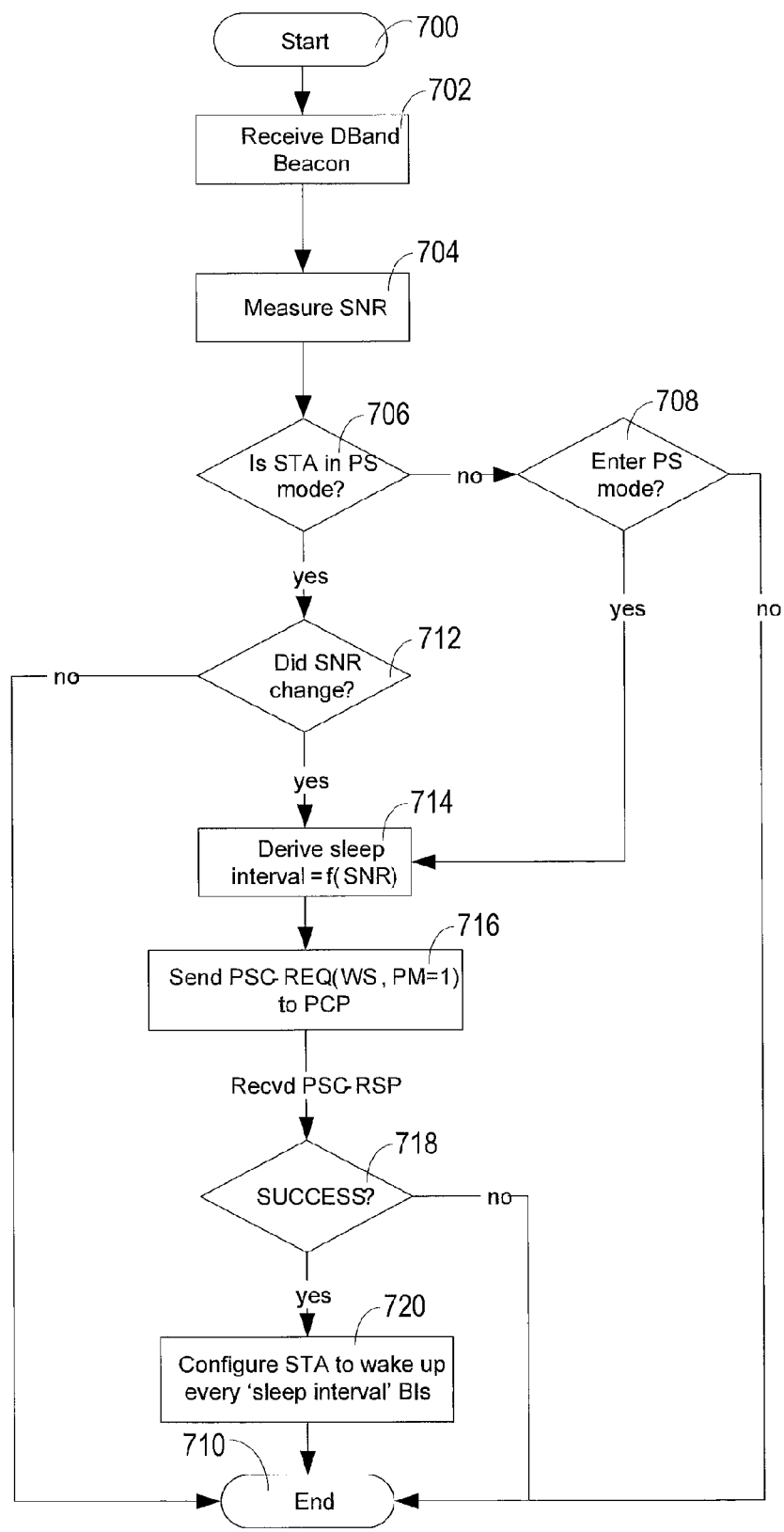
FIG. 7 is an example flowchart illustrating adjustment of sleep interval timing according to a channel characteristic.

FIG. 7 is an example flowchart illustrating adjustment of sleep interval timing according to a channel characteristic in a wireless telecommunication device such as a station STA in a WGA network. The operations of the method illustrated in FIG. 7 may be performed, for example, by the processor 118 of the station 104 in the PBSS 100 of FIG. 1, using data and instructions stored in the memory 120 and processed signals determined by the radio circuit 122. The illustrated techniques may be extended to any suitable communication environment, however. The exemplary method begins at block 700.

At block 702, the station STA receives a DBand beacon. As described above, a DBand beacon is transmitted by a PCP/AP with known timing and includes predefined data including control information. Receiving the DBand beacon generally involves tuning a receiver to appropriate frequency, synchronizing timing, detecting the transmitted beacon, demodulating the encoded data and decoding the data contents of the beacon. In other systems, such as those that do not use a DBand beacon, another suitable base station transmission may be used to determine characteristics of the received signal or channel characteristics.

At block 704, the station STA measures a signal characteristic of the received DBand beacon. In the illustrated example, the signal to noise ratio (SNR) is measured. In other examples, any other suitable characteristic of the signal, such as received signal power, or any suitable characteristic of the channel, such as signal fading, may be measured and used in subsequent processing. After measuring the SNR or other characteristic, the station STA stores data indicative of the measured value in memory for subsequent use.

At block 706, the station STA determines if it is currently in power saving mode. Power saving mode is a low power operating state in which some circuitry of the station STA is powered down to reduce current drain and extend battery life. If the station STA is not in power saving mode, at block 708 the station determines if it should enter the power saving mode. The result of this decision will be based on the status of the station STA in the telecommunications network. For example, if the station STA has already transmitted a Power Save Configuration Request to the PCP/AP and in return received a Power Save Configuration Response, the station STA is free to enter the power saving mode. If not, the illustrated method ends at block 710 and other processing resumes.

If, at block 706, the station STA is in power saving mode, then at block 712, the station STA considers the SNR or other signal characteristic measured at block 704. For example, the station STA determines if the SNR changed since the previous measurement. This may be determined by retrieving the previously-stored SNR value for comparison with the current SNR value. Other determination techniques may be substituted, particularly if they involve less processing power and fewer memory accesses since the station STA is currently in the low power saving mode. If there was no change, the method ends at block 710.

If there was a change in the SNR since the last stored measurement, at block 714, duration of the sleep interval is derived based on the signal characteristic, such as SNR, or a channel characteristic. As illustrated in FIG. 5A and as described above, the function relating the characteristic such as SNR to the sleep interval duration si may take any suitable form. Further, the operation illustrated by block 714 may be implemented in any suitable, low power form such as indexing a lookup table.

Once the sleep interval has been determined, at block 716, the station STA communicates the Power Save Configuration Request PSC-REQ to the PCP/AP. In systems other than WGA, an appropriate communication to indicate entry into and the duration of the power saving mode may be used. Network specifications generally provide for transmission of housekeeping and administrative information between devices. Any such transmission may be used or specified.

Subsequently, the station STA receives the Power Save Configuration Response PSC-RSP. At block 718, the station STA determines if the received PSC-RSP indicates success and that entry into the power saving mode is confirmed. If not, the method ends at block 710. If power saving mode is confirmed, at block 720, the station STA configures itself to wake up periodically according to the new specified sleep interval duration. In the exemplary WGA system, sleep interval is an integer number such as 4 and the station STA will wake up every sleep interval number of beacon intervals. The method ends at block 710.

Using Number of Associated Stations

In the exemplary embodiment of FIG. 1, the PBSS 100 includes a single PCP/AP 102 and a first non-PCP/non-AP 104 and a second non-PCP/non-AP 106. Each non-PCP/non-AP is able to communicate directly with the PCP/AP 102 and the other non-PCP/non-AP in the PBSS. The presence of other radio devices in the network, and the possibility that other radios may be seeking to communicate as the station exits power saving state should be accommodated.

The more the number of non-PCP/non-AP STAs present in a PBSS, the greater is the need to be awake more frequently to interact with the STAs. The possibility of any peer STA wanting to send data to this STA is also higher. Also, higher are the chances for a peer STA to leave the PBSS or a new STA to join. Hence it would be better for any STA in power save (or Doze) state to be in power save state for less amount of time so that it is in awake state to receive beacons more frequently and is updated with information about STAs leaving or entering the PBSS sooner than later. This could be a typical scenario in a conference room where each member carries WGA-enabled mobile handsets and can send meeting slides to peers or share some technical data anytime during the meeting. In such an environment, where many STAs are active and may be randomly arriving in or leaving from the room, the STAs should not sleep for too long.

Hence, in some embodiments, the duration of the sleep interval of any one STA may vary inversely with the number of STAs associated with the PBSS. If the number of STAs present in a PBSS increases, the STA in power save mode should decrease its sleep interval. By following such a practice, the STA will not compromise its response time to communications (such as an Add Traffic Stream (ADDTS) request, for example) from peer STAs. In this method, the sleep interval is a function of the number of associated STAs in the PBSS. The STA includes a polling module configured to determine the number of associated STAs in the PBSS or other network on which the station STA operates, to determine if the number of STAs has changed, and when the number of STAs changes, to adjust the sleep interval duration based on the new number of STAs. The polling module may be implemented in hardware or implemented in software and operable in conjunction with a processor that controls operation of the station.

This can be expressed as si=$f(n)$:$n$=number of associated STAs in the PBSS

Like other telecommunication system specifications, the WGA specification defines a DBand Capabilities information element which contains the STA identifier and several data fields that are used to advertise the support of optional DBand capabilities of a DBand STA. The DBand Capabilities information element is present in an Association Request frame, an Association Response frame, Reassociation Request frame, Reassociation Response frame, Probe Request frame and Probe Response frame as defined by the WGA specification and can be present in a DBand Beacon frame, an Information Request frame and Information Response frame. Similar communications are defined in other specifications, as well.

Any STA can always find out how many other STAs are in the PBSS associated with the PCP by sending Information Request management frame requesting for the DBand Capability IE of all associated STAs (by setting the Target Address field in the Information Request frame as the broadcast address). The PCP will include the DBand Capability IEs of all associated STAs in the Information Response frame. Using this, any STA can find out how many other STAs are present in the PBSS.

Whenever a new STA joins or leaves the PBSS, the PCP can also let all other STAs in the PBSS know about it by including the DBand Capability IE in its beacon frames or send it in unsolicited Information Response frame.

FIG. 8B is an example state diagram illustrating use of the number of stations in a telecommunications network to adjust duration of a sleep interval. An input to the process is the number of associated stations. This is obtained, for example, from the PCP in a WGA system by sending an Information Request message. The station STA then enters a monitor state 804 where the number of stations is monitored. Monitoring may be done by repeated sending an Information Request message to get the current number of associated STAs. Alternatively, when the PCP advertises STAs in the PBSS of entering or leaving STAs, the number can be updated to determine that a new station has joined the PBSS 806 or a station has left the PBSS 810.

When the station STA determines that a new station has joined the PBSS 806, control proceeds to state 808 where the sleep interval duration is decreased. Any suitable relation or function f between number of stations in the network and sleep interval si may be used. One example of function f is the following:

$$si = f(n) = \lfloor M_{si} * \sin(\frac{\pi}{2n}) \rfloor$$

where $n \geq 1$

Where, $M_{si}$=maximum desired sleep interval and

0<$M_{si}$<dot11MaxLostBeacons

After decreasing the sleep interval at state 808, the process returns to state 804 to continue monitoring the number of stations in the network. If the station STA determines that another station has left the PBSS 810, the station STA enters state 812 to increase the sleep interval. The new sleep interval si may be determined using the function f above, or any other suitable relation.

Figure 9:
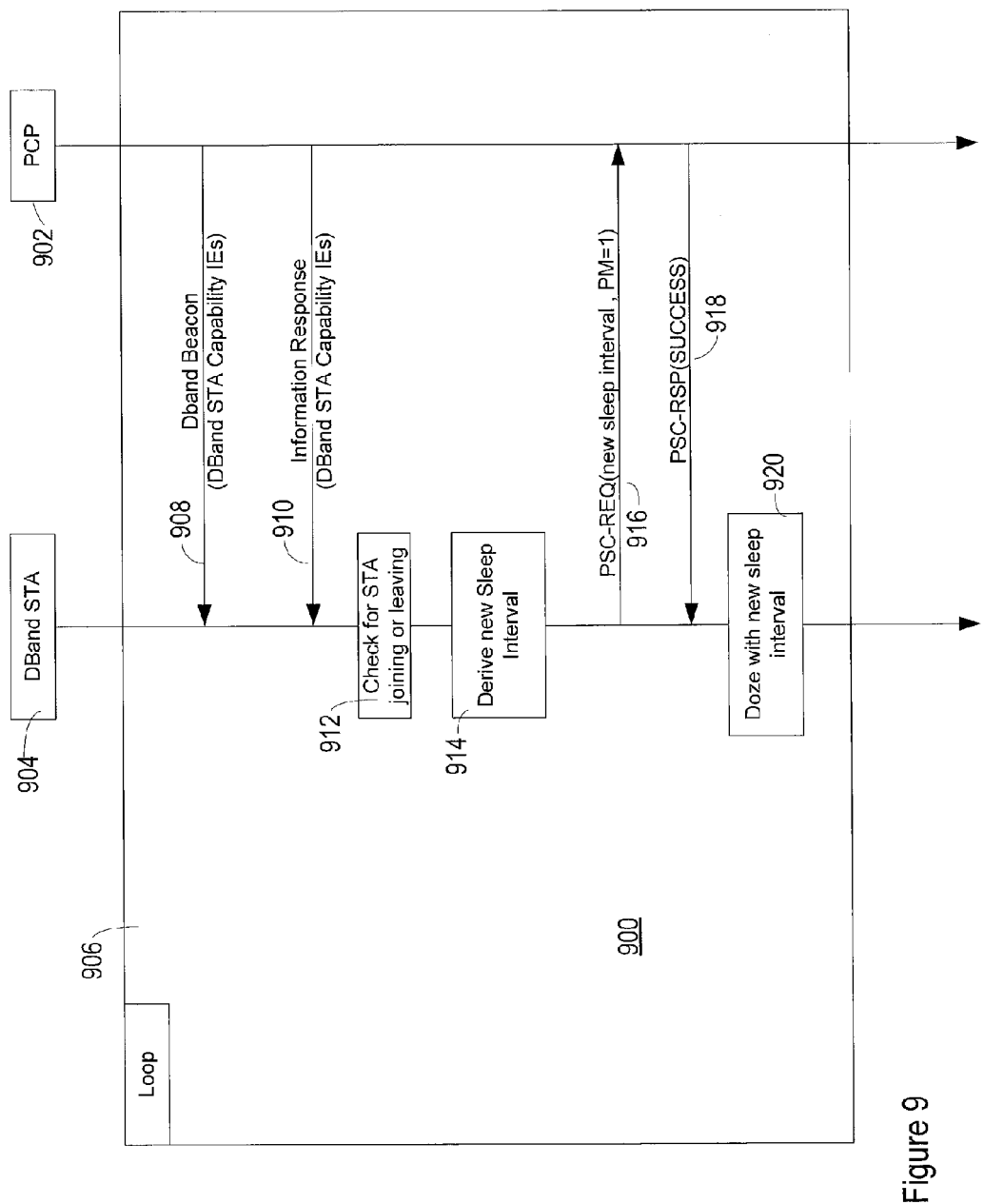
FIG. 9 is an example message sequence diagram illustrating interaction between elements of a telecommunication system for adjusting sleep interval duration according to number of telecommunication devices in the system.

FIG. 9 is an example message sequence diagram 900 illustrating interaction between elements of a telecommunication system for adjusting sleep interval duration according to number of telecommunication devices in the system. The message sequence diagram 900 illustrates interaction between a PCP/AP 902 and a DBand STA 904 of a PBSS in a WGA network. While a WGA network is used for this example, the techniques may be extended to other types of network as well.

The PCP/AP 902 and the STA 904 communicate in a loop 906 to permit the STA 904 to monitor the number of other stations in the PBSS and to adjust the sleep interval of the STA 904 accordingly. Initially in this example, the PCP/AP 902 transmits 908 a DBand Beacon which conveys DBand STA Capability information elements. This is a conventional network transmission. Subsequently, the PCP/AP 902 transmits 910 an Information Response which conveys DBand STA Capability Information Elements. These transmissions are received at the STA 904 and the number of stations present in the network of the PBSS is determined, stored and updated if needed. At block 912, the STA 904 determines if a station has joined the PBSS or left the PBSS. This may be done simply by maintaining a count of the STAs in the network and responding to variation in the count.

At block 914, the STA derives a new Sleep Interval that reflects the new count of STAs in the network. Any relation between number of STAs and the sleep interval may be used, such as the equation f described above.

Having determined the new sleep interval based on number of stations in the network the station STA begins to establish a new wakeup schedule with the PCP. Accordingly, the station STA transmits 916 a power save configuration request message PSC-REQ(new sleep interval, PM=1) to indicate to the PCP/AP 902 that it is transitioning to power saving mode or changing the sleep interval if already in power saving mode. In response, the PCP/AP 902 transmits 918 a power save configuration response message PSC-RSP(SUCCESS). The station STA 904 then enters the low power sleep mode with the newly determined interval at block 920.

Figure 10:
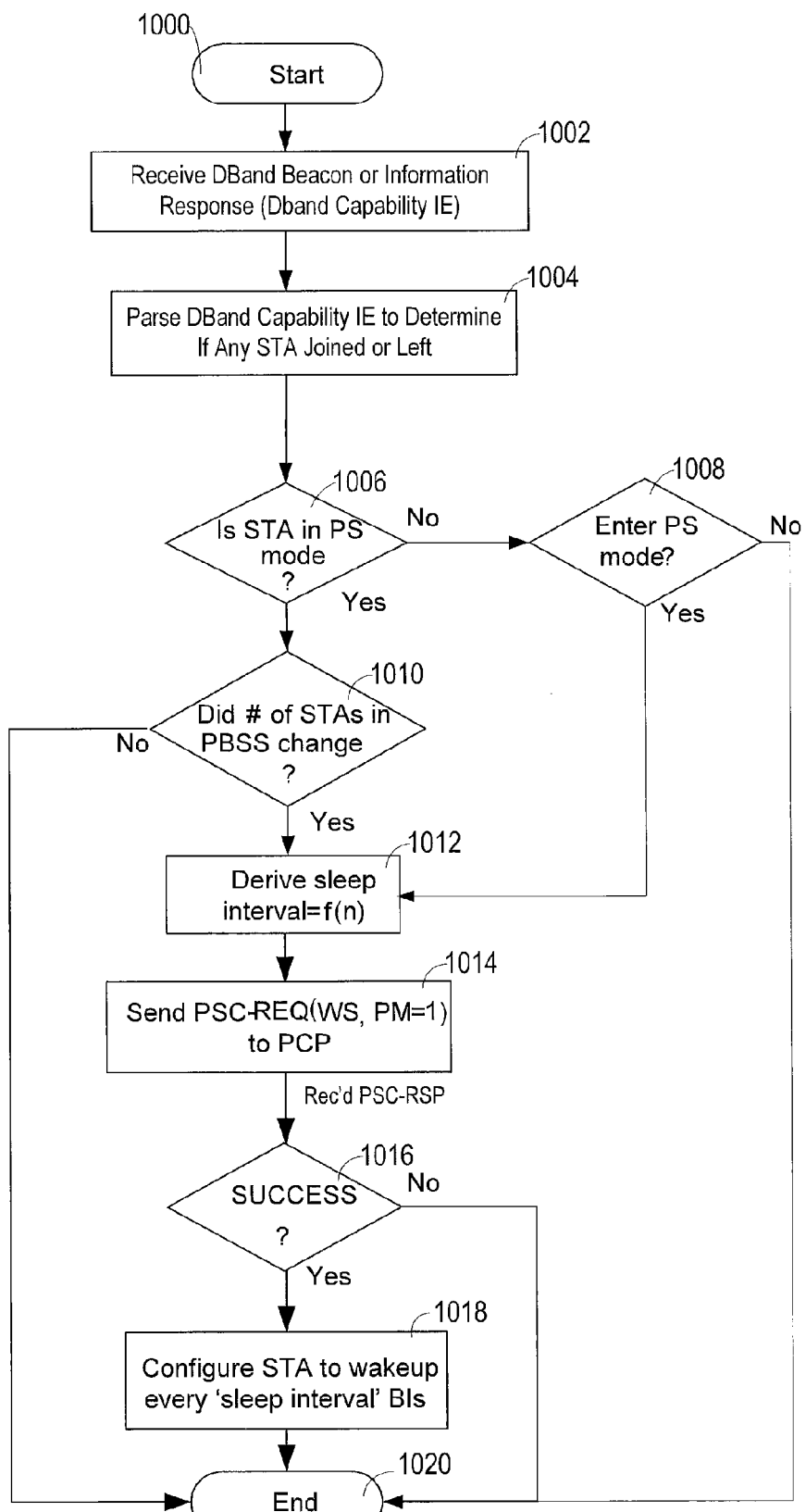
FIG. 10 is an example flowchart illustrating adjustment of sleep interval timing according to number of telecommunication devices in the system.

FIG. 10 is an example flowchart illustrating adjustment of sleep interval timing according to number of telecommunication devices in the system. The illustrated exemplary method may be performed by a non-PCP/non-AP STA in a WGA PBSS network. The illustrated techniques may be extended to other devices and other networks and other communication systems, however. The method begins at block 1000.

At block 1002, the station STA receives a DBand Beacon or Information Response which include a DBand Capability Information Element. At block 1004, the station STA parses the DBand Capability Information Element to determine if any station has joined or left the network. The station STA will extract the DBand Capability IE and extract the number of STAs associated. For example, the station STA could monitor a list of identifiers for stations present in the network and note newly added or newly departed stations from the list. In this manner, the station STA receives information about the number of other stations or telecommunication devices present and active in the network. The information may be stored in memory at the station.

At block 1006, the station STA determines if it is presently in power saving (PS) mode. If not, at block 1008, the station STA further determines if it should enter power saving mode.

If not, the method ends at block 1020. If the station STA should enter power saving mode, control proceeds to block 1012.

If, at block 1006, the station STA is in power saving mode, at block 1010, the station STA determines if the number of stations in the PBSS has changed. This determination is based on the information determined at block 1004. If there is no change in the number of stations in the network, the method ends at block 1020. However, if the number of stations in the network did change, at block 1012, the station STA determines the sleep interval to use during the power saving mode. This determination may be made in any suitable manner, such as using the function f(n) described above.

Upon determination of the sleep interval si, the station STA is ready to enter the power saving mode. At block 1014, the station STA transmits a Power Save Configuration Request PSC-REQ message to the PCP/AP. Upon receipt of a Power Save Configuration Response PSC-RSP message from the PCP/AP, the station STA determines if the Success acknowledgement was received, block 1016. If entry into the power save mode was not acknowledged, the method ends at block 1020. Otherwise, in response to the received acknowledgement, at block 1018 the station STA is configured to wake up every number of beacon intervals defined by the parameter Sleep Interval.

Using Idle Time

A STA such as station 104 and station 106 in FIG. 1 includes an idle time monitor module which periodically or continuously monitors the station's inactivity or idle time. The idle time monitor module ma y be implemented in hardware, for example as part of a radio circuit 122 of station 104 or radio circuit 132 of station 106, or as a software routine stored in memory 120 of station 104 or memory 130 of station 106 and implemented by the processor 118 of station 104 or processor 128 of station 106. When the idle time monitor module detects an increase in idle time or a decrease in activity by the station, the idle time monitor module will increase the sleep interval duration of the station. When the idle time monitor module detects any activity, the idle time monitor module may decrease the sleep interval duration or reset the sleep interval duration to a lowest value as per implementation.

In a further embodiment, the amount of time a STA is idle can be used to dynamically update its sleep interval duration. If there are frequent data transfer activities from or to the STA of concern, then the STA should not sleep for long periods of time so that the performance is not affected. Accordingly, the STA should have a relatively small sleep interval value. If the STA is idle for longer periods of time without having any transmit or receive activities, then slowly the STA can increase its sleep interval value.

One example is a scenario where a WGA enabled cellular handset is associated with a WGA enabled television. That is, the WGA enabled television operates as a PCP or AP to forms a PBSS. The handset forms a non-PCP/non-AP STA which is periodically away from its user who is not using the handset for communication. The handset can slowly increase its sleep interval to save power while the handset detects increasing idle time. That is, the sleep interval can be expressed as function of its idle time. In general, for any telecommunication device, $$si = f(t) \text{ where } t = \text{idle time}$$

The sleep interval is implementation dependent. In general, the sleep interval duration can be increased up to a maximum level which is not more than dot11MaxLostBeacons−1.

FIG. 11 is an example of use of device activity level in a network for determining duration of a sleep interval. In particular, FIG. 11A is an example of a relationship between duration of a sleep interval and idle time. The sleep interval si is plotted against idle time. Idle time is a measure of inactivity of a station STA. Inactivity occurs when the station is not engaged in communication with a PCP/AP or other non-PCP/non-STA. The illustrated relationship is exemplary only. As the idle timeout increases, the sleep interval which can be selected by a station increases, approaching a maximum value 1102. The sleep interval si has a maximum value defined by other conditions, such as the value of the parameter dot11MaxLostBeacons, although other conditions may set the maximum sleep interval.

FIG. 11B shows an example state machine for Sleep Interval increase or decrease. The state machine is implemented on a communication device operating in a telecommunication network, such as a station 104, 106 of the PBSS of FIG. 1. Operation begins at a monitor state, state 1104. When the STA detects an increase in idle time 1106, processing transfers to an increase sleep interval state 1108. During the increase interval state 1108, the station determines how much it can increase the sleep interval. This may be done a software routine operating on the processor of the station. One example of the sleep interval function can be the following equation:

$$si = f(t) = \left\lfloor M_{si} * \sin\left(\frac{\pi}{2} * \frac{t}{T_{max}}\right) \right\rfloor$$

where $$0 \le t \le T_{max}$$

In this equation,
$M_{si}$=maximum desired sleep interval,
$0 < M_{si} <$ dot11MaxLostBeacons, and
$T_{max}$=maximum inactivity timeout.

More specifically, to effectively monitor inactivity, in the monitor state 1104, typically a station STA may start a timer. The timer can be a software routine, for example. Initially, the timer has a low timeout value. When the timer expires at the expiration of the timeout value, the idle time monitor module will check if the STA is still idle. This can be done by monitoring activity of the radio circuit in the station STA. If the STA is still idle, this corresponds to an increase in idle time 1106 in FIG. 11B.

If the STA is still idle, a new value of sleep interval will be derived in accordance with the sleep interval function at state 1108. The STA will send the power save configuration request message PSC-REQ(new WS, PM=1) to the PCP/AP to indicate the use of new sleep interval. Upon receipt of the PSC-RSP(SUCCESS) message from the PCP, the STA will enter the power saving mode with the new sleep interval and processing returns to state 1104. The idle time monitor module will then start a new timer with higher timeout value. Upon the expiry of the new timeout interval, if the STA is still idle, it will increase its sleep interval again, state 1108. This process of incrementing the sleep interval duration can continue until the inactivity was detected for a maximum timeout period of time and the determined sleep interval has reached its desired maximum value. The maximum permitted value may be set by other factors, such as the value of the dot11MaxLostBeacons parameter. Subsequently, the STA will set its timeout value to be always the maximum timeout value.

If at any time the STA sees there was activity, step 1110, control will transition to step 1112 to decrease or reset the sleep interval duration. Detected activity may be any activity by the radio circuit of the station, such as receipt of data for transmission or powering up of the transmitter, or detection of a received transmission from another radio intended for the station. In response to the detected activity, the idle time monitor module will decrease the sleep interval or reset the sleep interval to a lowest value and start the monitor timer with lowest timeout value, state 1112. The idle time monitor module will continue decrementing the timeout value until the STA exits Power Save mode.

Figure 12:
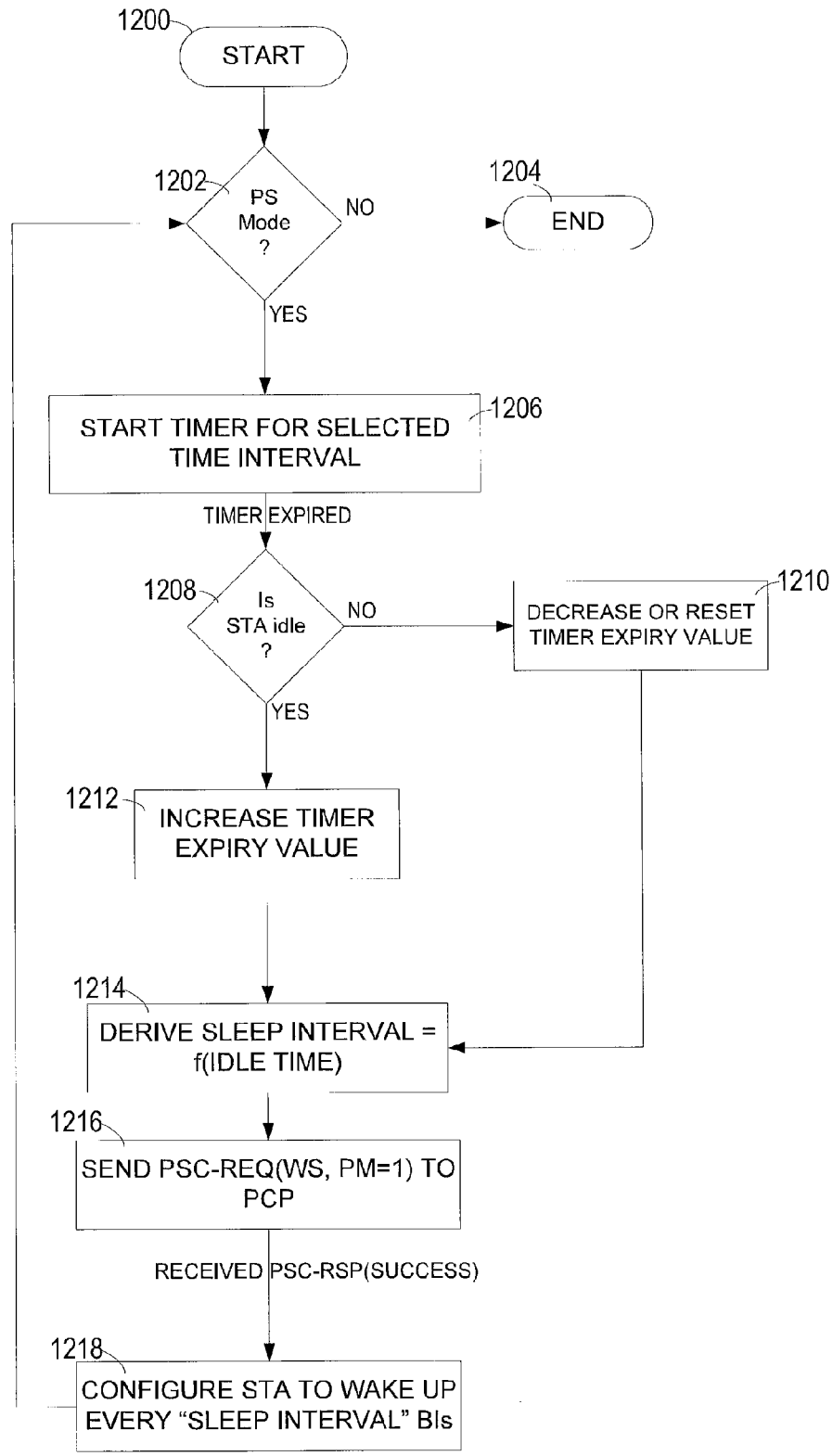
FIG. 12 is an example flowchart illustrating adjustment of sleep interval timing according to network communication activity.

FIG. 12 is an example flowchart illustrating adjustment of sleep interval timing according to network communication activity. The exemplary method may be performed by a station STA operating in a WGA PBSS. For example, the method may be implemented as part of an idle time monitor module in a processor of the station STA. In other embodiments, the exemplary method may be adapted to be performed by other mobile communication devices operating in other telecommunication networks. The method begins at block 1200.

At block 1202, the STA determines if it is in power saving (PS) mode. If not, the method ends at block 1204. If the station is in power saving mode, at block 1206, a timer is started. The timer may be a hardware timer or a software timer which counts to a count value which is selected to time a predetermined time interval. When the timer expires, control proceeds to block 1208 where the station STA determines if is idle. The station is idle when it is not engaged in any communication activity, for example with other elements of the PBSS.

If the station STA is not idle, control proceeds to block 1210. At block 1210, the timer expiry value is decreased or reset. Any suitable amount of decrease may be used, such as 500 ms. The decrease may be determined by reducing the count value used by the timer. Alternatively, the timer may be reset to a minimum or zero value. This reset strategy will tend to reduce the effect of the power saving mode by possible exiting earlier than required but the reset strategy will also help ensure that no communication intended for the station STA is missed. After decreasing or resetting the timer expiry value, control proceeds to block 1214.

If the station STA is still idle at block 1208, at block 1212 the timer expiry value is increased. Any suitable amount of increase may be used, such as 500 ms.

At block 1214, the station derives a sleep interval duration as a function of the current idle time. Any suitable relation may be used, such as the exemplary relation given above. Once the sleep interval has been determined, the station STA begins the process to enter sleep mode. The station STA formats and sends a Power Save Configuration Request (PSC-REQ) frame, block 1216.

When a corresponding Power Save Configuration Response PSC-RSP(Success) frame is received at block 1218, at block 1218 the station STA enters the power saving mode. The station STA is configured to wake up after a newly derived sleep interval duration equal to the number of beacon intervals specified by the parameter Sleep Interval.

Control then returns to block 1202 where the station STA determines if it is still in power saving mode. The station STA remains in a loop including blocks 1202, 1206, 1208, 1210, 1212, 1214, 1216 and 1218 until the station determines it is no longer in the power saving mode and exits at block 1204. During this looping operation, the method increases or decreases the timer duration according to activity of the STA. As activity increases, the timer duration is decreased. As activity decreases, the timer duration is increased. In this manner, the sleep interval duration is dynamically adjusted according to activity level of the station STA.

From the foregoing, it can be seen that the disclosure provides apparatus and methods for dynamically adjusting the duration of a sleep interval. Immediate factors can be used as the basis for the adjustment before entering the sleep interval. For example, a system reliability parameter such as the maximum permitted number of missed transmissions can be used to set an upper bound for the duration of the sleep interval. For enhanced reliability, the upper bound can be scaled to a smaller number, still based on the system reliability parameter. In another example, a channel characteristic such as signal to noise ratio may be monitored and used to dynamically select and vary the sleep interval duration. As quality and reliability of communication of the channel varies, the duration of the sleep interval is varied accordingly. For example, when the received signal has poor signal to noise ratio so that reliable beacon reception is less likely upon exit from the low power sleep state, the duration of the sleep interval will be reduced so that, upon exit, more beacons will be available for detection at the receiver. In another example, a station uses network information such as the number of active stations in the network to dynamically select and vary the sleep interval duration. As other devices enter and leave the network, the duration of the sleep interval may be revised to improve the likelihood of reliably maintaining communication with the network. In yet another example, a station uses communication activity, or its analog, device idle time, to dynamically update the duration of the sleep interval. These methods may be used in any combination during operation of a radio in a network. Moreover, these methods may be dynamically selected, activated and inactivated throughout the communication process to improve or optimize performance of a communication device or the communication network.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The processing capability of the system may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the disclosure have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method comprising:
   receiving at a telecommunication device a radio transmission from a remote telecommunication device in a radio communication network;
   extracting from the radio transmission data defining a system reliability parameter established for radio communication by telecommunication devices communicating on the radio communication network, the data defining a system reliability parameter defining a maximum time duration during which the telecommunication device may be out of communication with the remote communication device on the radio communication network;
   using the system reliability parameter to determine a sleep interval duration for a power saving state;
   entering the power saving state;
   upon expiration of the sleep interval duration, exiting the power saving state;
   at the telecommunication device, detecting a time-varying channel characteristic for a signal transmission; and
   adjusting the sleep interval duration based on the channel characteristic.

2. The method of claim 1 wherein the telecommunication device comprises a wireless radio and wherein extracting the system reliability parameter from the radio transmission comprises extracting a maximum lost beacons parameter from a control beacon transmitted by the remote telecommunication device, the maximum lost beacons parameter defining a maximum number of beacon intervals within which the telecommunication device must communicate a predefined message in order to remain synchronized with the remote telecommunication device.

3. The method of claim 1 further comprising:
   measuring signal to noise ratio as the time-varying channel characteristic for the received radio transmission from the remote telecommunication device; and
   determining a sleep interval duration for a subsequent entry into the power saving state based on the signal to noise ratio.

4. The method of claim 3 further comprising:
   after exiting the power saving state, receiving a subsequent radio transmission from a remote telecommunication device;
   measuring an updated signal to noise ratio for the subsequent received radio transmission;
   if the updated signal to noise ratio varies from the signal to noise ratio, determining a new sleep interval duration for subsequent use during entry into the power saving state based on the updated signal to noise ratio;
   entering the power saving state; and
   upon expiration of the new sleep interval duration, exiting the power saving state.

5. A method comprising:
   receiving at a telecommunication device a radio transmission from a remote telecommunication device in a radio communication network;
   extracting from the radio transmission data defining a system reliability parameter established for radio communication by telecommunication devices communicating on the radio communication network, the data defining a system reliability parameter defining a maximum time duration during which the telecommunication device may be out of communication with the remote communication device on the radio communication network;
   using the system reliability parameter to determine a sleep interval duration for a power saving state;
   entering the power saving state;
   upon expiration of the sleep interval duration, exiting the power saving state;
   determining a number of other telecommunication devices communicating in the radio communication network formed by the remote telecommunication device; and
   adjusting the sleep interval duration based on the number of other telecommunication devices.

6. The method of claim 5 further comprising:
   at the telecommunication device, transmitting an information request query to the remote telecommunication device;
   in response to the information request query, receiving a transmission with information about the other telecommunication devices; and
   parsing the transmission to determine the number of other telecommunication devices.

7. The method of claim 6 further comprising:
   after exiting the power saving state, transmitting a subsequent radio information request query to the remote telecommunication device;
   in response to the subsequent information request query, receiving a response transmission with new information about the other telecommunication devices; and
   parsing the response transmission to determine an updated number of other telecommunication devices;
   if the updated number of other telecommunication devices varies from the previously determined number of other telecommunication devices, determining a new sleep interval duration based on the updated number of other telecommunication devices;
   entering the power saving state; and
   upon expiration of the new sleep interval duration, exiting the power saving state.

8. A method comprising:
   receiving at a telecommunication device a radio transmission from a remote telecommunication device in a radio communication network;
   extracting from the radio transmission data defining a system reliability parameter established for radio communication by telecommunication devices communicating on the radio communication network, the data defining a system reliability parameter defining a maximum time duration during which the telecommunication device may be out of communication with the remote communication device on the radio communication network;
   using the system reliability parameter to determine a sleep interval duration for a power saving state;
   entering the power saving state;
   upon expiration of the sleep interval duration, exiting the power saving state;
   periodically determining if the telecommunication device is idle;

updating the sleep interval duration based on the determination;
entering a subsequent power saving state; and
using the updated sleep interval duration to time duration of the subsequent power saving state.

9. The method of claim 8 further comprising:
setting a timer expiry value to time an idle duration;
in response to a determination that the telecommunication device is idle, increasing the timer expiry value to a new expiry value;
in response to a determination that the telecommunication device is not idle, decreasing the timer expiry value to a new expiry value;
determining a new sleep interval duration based on a new idle time duration;
entering the subsequent power saving state; and
upon expiration of the new sleep interval duration, exiting the subsequent power saving state.

* * * * *